United States Patent
Click et al.

(10) Patent No.: US 9,556,050 B2
(45) Date of Patent: Jan. 31, 2017

(54) PROCESS FOR CULLET BENEFICIATION

(71) Applicant: Owens-Brockway Glass Container Inc., Perrysburg, OH (US)

(72) Inventors: Carol A Click, Corning, NY (US); Udaya Vempati, Perrysburg, OH (US); Edward A Ordway, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 459 days.

(21) Appl. No.: 14/057,112

(22) Filed: Oct. 18, 2013

(65) Prior Publication Data
US 2015/0110980 A1 Apr. 23, 2015

(51) Int. Cl.
C03B 3/02 (2006.01)
C03C 1/00 (2006.01)
C03C 1/02 (2006.01)
C03B 5/00 (2006.01)

(52) U.S. Cl.
CPC ............... *C03B 3/02* (2013.01); *C03B 5/005* (2013.01); *C03C 1/002* (2013.01); *C03C 1/024* (2013.01); *Y02P 40/52* (2015.11); *Y10T 428/131* (2015.01)

(58) Field of Classification Search
CPC ........ C03B 5/005; C03B 3/02; Y10T 428/131; Y02P 40/52; C03C 1/002; C03C 1/024
See application file for complete search history.

(56) References Cited

U.S. PATENT DOCUMENTS

| | | |
|---|---|---|
| 3,345,190 A | 10/1967 | Albinak |
| 3,589,885 A | 6/1971 | Monks |
| 4,988,376 A | 1/1991 | Mason |

FOREIGN PATENT DOCUMENTS

| | | |
|---|---|---|
| DE | 19605030 A1 | 8/1997 |
| JP | 2012239945 | 12/2012 |
| WO | 2014184187 | 11/2014 |

OTHER PUBLICATIONS

XP002733596, Database WPI, Week 201301, Thomson Scientific, London, GB, AN 2012-R22250, & JP 2012 239945 A (Asahi Glass Co Ltd) Dec. 10, 2012, Abstract.
PCT International Search Report and Written Opinion, Int Serial No. PCT/US2014/059805, Int Filing Date: Oct. 9, 2014, Applicant: Owens-Brockway Glass Container Inc., Mail Date: Dec. 18, 2014.

*Primary Examiner* — Michael C Miggins

(57) ABSTRACT

A process for cullet beneficiation by precipitation. A mass of cullet is melted to form a body of molten glass having a heavy metal con ration of greater than 100 ppm. A precipitate agent is introduced into the body of molten glass to form a heavy metal-containing precipitate phase and a liquid beneficiated glass phase within the body of molten glass. The precipitate phase may have a density greater than that of the liquid beneficiated glass phase. Thereafter, the liquid beneficiated glass phase is physically separated from the precipitate phase. The separated liquid beneficiated glass phase has a reduced concentration of heavy metals, as compared to the concentration of heavy metals in the body of molten glass.

20 Claims, 1 Drawing Sheet

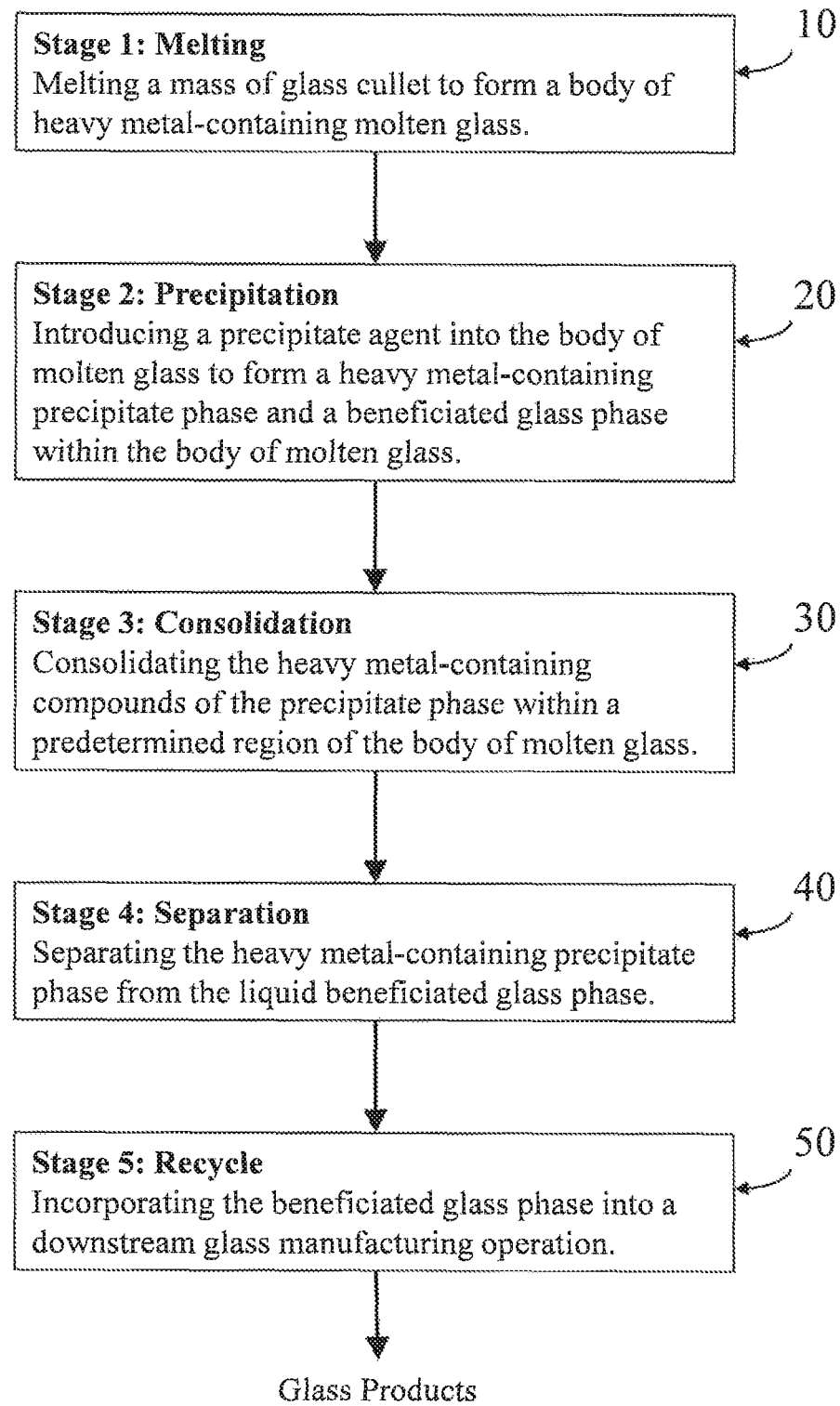

PROCESS FOR CULLET BENEFICIATION

The present disclosure is directed to recycling of waste glass and, more particularly, to a process for preparing a mass of cullet for reuse.

BACKGROUND AND SUMMARY OF THE DISCLOSURE

Post-industrial and post-consumer waste glass that is collected with the purpose of recycling is known as "cullet." Post-industrial waste glass may include waste glass that has been produced during the manufacture of any glass-containing product. Post-consumer waste glass generally may include waste glass that has been collected by municipal or commercial recycling efforts, and also may include a combination of clear and/or colored glass bottles, containers, cookware, tableware, glassware, plate glass, solar panels, decorative glass, and the like.

Cullet may include a mixture of one or more types of glass, e.g., a mixture of soda-lime glass, lead crystal glass, and/or borosilicate glass. Soda-lime glass, which includes container glass and flat glass, may have a chemical composition that includes 71-75 wt % $SiO_2$, 12-16 wt % $Na_2O$, and 10-15 wt % CaO, including all ranges and subranges therebetween. Lead crystal glass may include 54-65 wt % $SiO_2$, 25-30 wt % PbO, and 13-15 wt % $Na_2O$ and/or $K_2O$, and borosilicate glass may include 70-80 wt % $SiO_2$, 7-15 wt % $B_2O_3$, 4-8 wt % $Na_2O$ and/or $K_2O$, and $Al_2O_3$, including all ranges and subranges between those ranges. These types of glasses also may include relatively small amounts of other materials.

During the waste glass collection process, other unwanted materials may be collected along with the glass. For example, metal closures, foil labels, and/or scrap metal may be collected along with the waste glass during the collection process, and their inclusion may result in the cullet having an unacceptable concentration of heavy metals such that the cullet is not suitable for use in the production of certain glass products, e.g., glass containers.

A general object of the present disclosure, in accordance with one aspect of the disclosure, is to provide a process for removing or reducing the concentration of heavy metals in a mass of cullet. Beneficiated glass produced by the presently disclosed process may contain an acceptably low concentration of heavy metals and thus may be incorporated into a downstream glass manufacturing operation and used to make new glass products, e.g., glass containers.

The present disclosure embodies a number of aspects that can be implemented separately from or in combination with each other.

A process for cullet beneficiation in accordance with one aspect of the disclosure includes: (a) melting a mass of cullet having a heavy metal concentration of greater than 100 ppm to form a body of molten glass; (b) introducing a precipitate agent into the body of molten glass to form a heavy metal-containing precipitate phase and a liquid beneficiated glass phase within the body of molten glass; and then (c) separating the liquid beneficiated glass phase from the precipitate phase. The precipitate phase formed within the body of molten glass has a density greater than that of the beneficiated glass phase. After the liquid beneficiated glass phase is separated from the precipitate phase in step (c), the liquid beneficiated glass phase may have a reduced concentration of heavy metals, as compared to the concentration of heavy metals in the mass of cullet.

In accordance with another aspect of the disclosure, there is provided a process for preparing a mass of cullet for use in a downstream glass manufacturing operation. The process includes (a) melting a mass of cullet in a pre-reactor located upstream of a continuous glass melting furnace to form a body of molten glass in the pre-reactor; (b) introducing an oxide of titanium or sulfur, or a mixture thereof, into the body of molten glass to form a heavy metal-containing precipitate phase and a liquid beneficiated glass phase within the body of molten glass; (c) consolidating the precipitate phase within a bottom portion of the body of molten glass such that the liquid beneficiated glass phase is located above the precipitate phase within the pre-reactor; and then (d) separating the liquid beneficiated glass phase from the precipitate phase by drawing at least a portion of the liquid beneficiated glass phase off a top portion of the body of molten glass. The mass of cullet melted in the pre-reactor has a heavy metal concentration of greater than 100 ppm and includes at least one heavy metal selected from the group consisting of lead (Pb), cadmium (Cd), chromium (Cr), and mercury (Hg). The precipitate phase formed within the body of molten glass includes at least one compound selected from the group consisting of lead titanate ($PbTiO_3$) and lead sulfate ($PbSO_4$).

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a block diagram of a process for cullet beneficiation in accordance with an illustrative embodiment of the present disclosure.

DETAILED DESCRIPTION

The process for cullet beneficiation disclosed herein may be used to remove or reduce the concentration of various heavy metals in cullet. In some embodiments, the process may be used to remove or reduce the concentration of heavy metals in cullet that initially has a heavy metal concentration of greater than 100 ppm. For example, in some specific embodiments, the cullet may initially have a heavy metal concentration of between 100 ppm and 1000 ppm, including all ranges and subranges therebetween. Some examples of heavy metals that may be present in the cullet before it is treated include lead (Pb), cadmium (Cd), chromium (Cr), and mercury (Hg).

Cullet treated by the process disclosed herein may include a mixture of post-industrial and/or post-consumer waste glass. The cullet may be provided, for example, in the form of broken or crushed glass pieces, e.g., chunks or shards, or as a powder having a mean particle diameter in the range of about one millimeter to about twenty millimeters.

FIG. 1 illustrates a process for cullet beneficiation in accordance with an illustrative embodiment of the present disclosure. A first stage 10 of the process includes forming a body of molten glass from a mass of cullet that contains at least one heavy metal to be removed or reduced in concentration. The body of molten glass may be formed by melting the mass of cullet with or without other materials at a temperature in the range of 1200 degrees Celsius to 1500 degrees Celsius, including all ranges and subranges therebetween. This stage may result in the volatilization and release of one or more heavy metals, e.g., mercury (Hg), from the mass of cullet. If the body of molten glass is formed by melting the mass of cullet with one or more other materials, the cullet may account for at least 99 wt. % of the body of molten glass. In some embodiments, the body of molten glass may be formed in a pre-reactor, melter, or pot furnace located upstream of a continuous glass melting furnace.

A precipitate agent may be introduced into the body of molten glass in a second stage 20 of the process to form a heavy metal-containing precipitate phase and a liquid beneficiated glass phase within the body of molten glass. This may include determining the concentration of heavy metals in the body of molten glass, and then introducing the precipitate agent into the body of molten glass in an amount based upon the concentration of heavy metals in the body of molten glass. In some embodiments, this may including introducing the precipitate agent into the body of molten glass in an amount constituting between 0.01 wt. % and 5.0 wt. % of the body of molten glass, including all ranges and subranges therebetween.

The precipitate agent introduced into the body of molten glass may be selected based upon the type of heavy metal or types of heavy metals that are contained in the body of molten glass. Suitable precipitate agents include chemical compounds that can selectively react with the one or more heavy metals dissolved within the body of molten glass to form heavy metal containing precipitates, or heavy metal-containing compounds that are solid and insoluble in the body of molten glass. The precipitated heavy metal-containing compounds will suitably remain in solid state throughout the range of temperatures needed to form the body of molten glass and maintain the beneficiated glass phase in a liquid state.

Some specific examples of precipitate agents that may be used to form heavy metal containing precipitates within the body of molten glass include titanium (Ti), titanium oxide ($TiO_2$), and sulfur oxide ($SO_x$), as these compounds can react with lead (Ph) dissolved within a body of molten glass to form lead (Pb)containing precipitates. In particular, both titanium (Ti) and titanium oxide ($TiO_2$) can react with lead (Pb) to form solid lead titanate ($pbTiO_3$), which has a density of about 7.52 $g/cm^3$, and sulfur trioxide ($SO_3$) can react with lead (Pb) to form solid lead sulfate ($PbSO_4$), which has a density of about 6.29 $g/cm^3$.

After precipitation, the body of molten glass may be in the form of a suspension, with the solid heavy metal-containing compounds of the precipitate phase being dispersed throughout the liquid beneficiated glass phase.

In a third stage 30, the heavy metal-containing compounds of the precipitate phase may be consolidated within a predetermined region of the body of molten glass. By consolidating the solid heavy metal-containing compounds, the concentration of heavy metals in the remaining portion of the body of molten glass may be reduced, The heavy metal-containing compounds may be consolidated within the body of molten glass by sedimentation, for example, if the compounds have a density greater than that of the liquid beneficiated glass phase, e.g., greater than about 2.5 $g/cm^3$. During sedimentation, the heavy metal-containing compounds of the precipitate phase may settle out of the liquid beneficiated glass phase due to the force of gravity acting on them. In such case, the solid heavy metal-containing compounds may become consolidated in a bottom portion of the body of molten glass or on or behind a barrier located within the body of molten glass. In other embodiments, the heavy metal-containing compounds may settle out of the liquid beneficiated glass phase due to another applied force, e.g., an applied centrifugal force.

After consolidation of the precipitated heavy metal-containing compounds, the liquid beneficiated glass phase and the precipitate phase may be separated from each other in a fourth stage 40. The liquid beneficiated glass phase and the precipitate phase may be separated from each other, for example, by removing the precipitate phase from the body of molten glass or vice versa. Any suitable method may be used to separate the liquid beneficiated glass phase from the precipitate phase. For example, if the body of molten glass is held within a pot furnace, the liquid beneficiated glass phase may be removed from the furnace via ladling, pouring, pumping, or siphoning at least a portion of the liquid therefrom. If the precipitate phase is consolidated in a bottom portion of a pot furnace, the precipitate phase may be physically separated from the liquid beneficiated glass phase, for example, by tapping the furnace. If the body of molten glass is held within a tank furnace, the precipitate phase may be consolidated in a bottom portion of the body of molten glass, and the liquid beneficiated glass phase may be allowed to flow off of a top portion of the body of molten glass, to a location downstream of the tank. A physical barrier between the consolidated precipitate phase and the liquid beneficiated glass phase may be placed within the body of molten glass during the separation process.

After separation, the liquid beneficiated glass phase may contain less than about 100 ppm heavy metals, and thus may exhibit a suitable chemical composition for use in the manufacture of new glass products.

In a fifth stage 50, the liquid beneficiated glass phase may be reused by being incorporated into another process and/or manufacturing operation. This may include introducing the beneficiated glass phase into another process or manufacturing operation while it is still in liquid phase. In other embodiments, this may include quenching the liquid beneficiated glass phase to produce beneficiated cullet that exhibits a suitable composition for use in various downstream manufacturing operations.

In some embodiments, the beneficiated glass phase may be reused by being incorporated into a downstream glass manufacturing operation where it may be used to make new glass products, e.g., glass containers. The beneficiated glass phase may be incorporated into a downstream glass manufacturing operation, for example, by being supplied, in liquid or solid phase, to a glass furnace. The beneficiated glass phase may be directly supplied to the glass furnace, or it may be mixed with other glass-forming materials and the resulting mixture may be supplied to the glass furnace There thus has been disclosed a process for cullet beneficiation, that filly satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for cullet beneficiation that includes:
   (a) melting a mass of cullet having a heavy metal concentration of greater than 100 ppm to form a body of molten glass;
   (b) introducing a precipitate agent into said body, of molten glass to form a heavy metal-containing precipitate phase and liquid beneficiated glass phase within said body of molten glass, said precipitate phase having a density greater than that of said beneficiated glass phase; and then (c) separating said liquid beneficiated glass phase from said precipitate phase.

2. The process set forth in claim 1 that also includes:
before said step (c), consolidating said precipitate phase within a predetermined region of said body of molten glass.

3. The process set forth in claim 1 wherein said mass of cullet includes at least one heavy metal selected from the group consisting of lead (Pb), cadmium (Cd), chromium (Cr), and mercury (Hg).

4. The process set forth in claim 1 wherein, after said step (c), said beneficiated glass phase has a reduced concentration of at least one heavy metal, as compared to said mass of cullet.

5. The process set forth in claim 1 wherein, after said step (c), said beneficiated glass phase contains less than 100 ppm heavy metals.

6. The process set forth in claim 1 that also includes:
after said step (c), incorporating at least a portion of said beneficiated glass phase into a downstream glass manufacturing operation.

7. The process set forth in claim 1 that also includes:
after said step (c), supplying at least a portion of said beneficiated glass phase to a glass furnace to produce a glass melt, and making glass products from said glass melt.

8. The process set forth in claim wherein said step (a) includes beating said mass of cullet to a temperature sufficient to volatize at least one heavy metal contained within said mass of cullet.

9. The process set forth in claim 1 wherein said step (a) includes beating said mass of cullet to a temperature in the range of 1200 degrees Celsius to 1500 degrees Celsius.

10. The process set forth in claim 1 wherein said precipitate phase includes at least one heavy metal-containing compound having a density greater than 2.5 g/cm$^3$.

11. The process set forth in claim 1 wherein said precipitate agent includes titanium, an oxide of titanium or sulfur, or a mixture thereof.glass furnace to produce a glass melt, and making glass products from said glass melt.

12. The process set forth in claim 1 wherein said precipitate phase includes at least one compound selected from the group consisting of lead titanate (PbTiO$_3$) and lead sulfate (PbSO$_4$).

13. The process set forth in claim 1 that also includes:
determining the concentration of the metals in said body of molten glass.

14. The process set forth in claim 1 that also includes;
introducing said precipitate agent into said body of molten glass in an amount based upon the concentration of heavy metals in said both of molten glass.

15. The process set forth in claim 1 that also includes:
determining the type of heavy metals in said body of molten glass.

16. The process set forth in claim 1 that also includes:
selecting said precipitate agent based upon the type of heavy metals contained in said body of molten glass.

17. The process set forth in claim 1 wherein said steps (a)-(c) are carried out within a cullet pre-reactor upstream of a glass melting furnace.

18. The process set forth in claim 1 that also includes:
before said step (c), consolidating said precipitate phase within a bottom portion of said body of molten glass by sedimentation.

19. The process set forth in claim 18 wherein said step (e) includes drawing at least a portion of said liquid beneficiated glass phase off a top portion of said body of molten glass.

20. A process for preparing a mass of cullet for use in a downstream glass manufacturing operation that includes:

(a) melting a mass of cullet in a pre-reactor located upstream of a continuous glass melting furnace to form a body of molten glass in said pre-reactor, said mass of cullet having a heavy metal concentration of greater than 100 ppm and including at least one heavy metal to selected from the group consisting of lead (Pb), cadmium (Cd), chromium (Cr), and mercury (Hg);

(b) introducing titanium, an oxide of titanium, an oxide of sulfur, or a mixture thereof, into said body of molten glass to form a heavy metal-containing precipitate phase and a liquid beneficiated glass phase within said body of molten glass, said precipitate phase including at least one compound selected from the group consisting of lead titanate (PbTiO$_3$) and lead sulfate (PbSO$_4$);

(c) consolidating said precipitate phase within a bottom portion of said body of molten glass such that said liquid beneficiated glass phase is located above said precipitate phase within said pre-reactor; and then (d) separating said precipitate phase and said liquid beneficiated glass phase from each other by drawing at least a portion of said beneficiated glass phase off a top portion of said body of molten glass.

* * * * *